US008326467B2

(12) United States Patent
Rivers, Jr. et al.

(10) Patent No.: US 8,326,467 B2
(45) Date of Patent: Dec. 4, 2012

(54) CONTROLLER AND METHOD OF CONTROLLING A POWER SYSTEM

(75) Inventors: Cecil Rivers, Jr., West Hartford, CT (US); Seth Adam Cutler, Bridgeport, CT (US); Michiel Hoogmartens, Ghent (BE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/225,975

(22) Filed: Sep. 6, 2011

(65) Prior Publication Data

US 2012/0095612 A1 Apr. 19, 2012

(51) Int. Cl.
*G05D 11/00* (2006.01)

(52) U.S. Cl. .......................................... 700/297; 700/22

(58) Field of Classification Search ..................... 700/22, 700/27, 33, 286, 297; 701/22
See application file for complete search history.

(56) References Cited

U.S. PATENT DOCUMENTS

| 6,724,172 | B2 * | 4/2004 | Koo ................................ 320/128 |
| 7,554,292 | B2 | 6/2009 | Veselic |
| 7,671,567 | B2 | 3/2010 | Eberhard et al. |
| 7,967,711 | B2 | 6/2011 | Conlon et al. |
| 2008/0125928 | A1 | 5/2008 | Conlon et al. |
| 2010/0039062 | A1 | 2/2010 | Gu et al. |
| 2011/0015799 | A1 * | 1/2011 | Pollack et al. ................ 700/291 |
| 2011/0047052 | A1 | 2/2011 | Cornish |
| 2011/0093127 | A1 | 4/2011 | Kaplan |
| 2011/0115295 | A1 * | 5/2011 | Moon et al. ..................... 307/65 |

* cited by examiner

*Primary Examiner* — Kakali Chaki
*Assistant Examiner* — Chad Rapp
(74) *Attorney, Agent, or Firm* — Global Patent Operation

(57) ABSTRACT

A controller for a power system including a plurality of power system components includes a memory for storing computer-executable instructions and a processor configured to execute the computer-executable instructions. The computer-executable instructions program the processor to determine an operating condition of at least one first power system component and at least one second power system component of the plurality of power system components. The processor is also programmed to determine whether a predetermined condition is met based on at least one operating condition, and transmit a command to at least one other controller to at least one of electrically couple the first power system component to the second power system component and electrically decouple the first power system component from the second power system component based on whether the predetermined condition is met.

20 Claims, 3 Drawing Sheets

CONTROLLER AND METHOD OF CONTROLLING A POWER SYSTEM

BACKGROUND OF THE INVENTION

The present application relates generally to power systems and, more particularly, to a controller and a method of controlling a power system.

In some known power systems, a plurality of photovoltaic panels (also known as solar panels) are logically or physically grouped together to form an array of solar panels. The solar panel array converts solar energy into electrical energy and transmits the energy to an electrical grid or other destination.

Solar panels generally output direct current (DC) electrical power. To properly couple such solar panels to an electrical grid, the electrical power received from the solar panels must be converted to alternating current (AC). At least some known power systems use an inverter to convert DC power to AC power. If, however, the electrical grid experiences a fault or an event in which the electrical grid is unusable or unavailable, the power generated by the solar panel array may be inaccessible to consumers.

In addition, during periods of high power demand, electrical loads may request or draw power in an amount that exceeds a supply of power. If the power system is unable to supply the power requested, a blackout may occur and may undesirably cause certain high priority loads to lose power.

BRIEF DESCRIPTION OF THE INVENTION

In one embodiment, a controller for a power system including a plurality of power system components is provided that includes a memory for storing computer-executable instructions and a processor coupled to the memory and to the plurality of power system components, wherein the processor is configured to execute the computer-executable instructions. The computer-executable instructions program the processor to determine an operating condition of at least one first power system component and at least one second power system component of the plurality of power system components. The processor is also programmed to determine whether a predetermined condition is met based on at least one operating condition, and transmit a command to at least one other controller to at least one of electrically couple the at least one first power system component to the at least one second power system component and electrically decouple the at least one first power system component from the at least one second power system component based on whether the predetermined condition is met.

In another embodiment, at least one computer-readable storage medium is provided having computer-executable instructions embodied thereon. When executed by a processor, the computer-executable instructions cause the processor to determine an operating condition of at least one first power system component and at least one second power system component of a plurality of power system components within a power system. The computer-executable instructions also cause the processor to determine whether a predetermined condition is met based on at least one operating condition, and transmit a command to at least one controller to at least one of electrically couple the at least one first power system component to the at least one second power system component and electrically decouple the at least one first power system component from the at least one second power system component based on whether the predetermined condition is met.

In yet another embodiment, a method of controlling a power system is provided. The method includes determining, by a first controller, an operating condition of at least one first power system component and at least one second power system component of a plurality of power system components within the power system. The method also includes determining, by the first controller, whether a predetermined condition is met based on at least one operating condition, and transmitting, by the first controller, a command to at least one second controller to at least one of electrically couple the at least one first power system component to the at least one second power system component and electrically decouple the at least one first power system component from the at least one second power system component based on whether the predetermined condition is met.

DETAILED DESCRIPTION OF THE INVENTION

In some embodiments, the term "electric vehicle" refers generally to a vehicle that includes one or more electric motors. Energy used by the electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
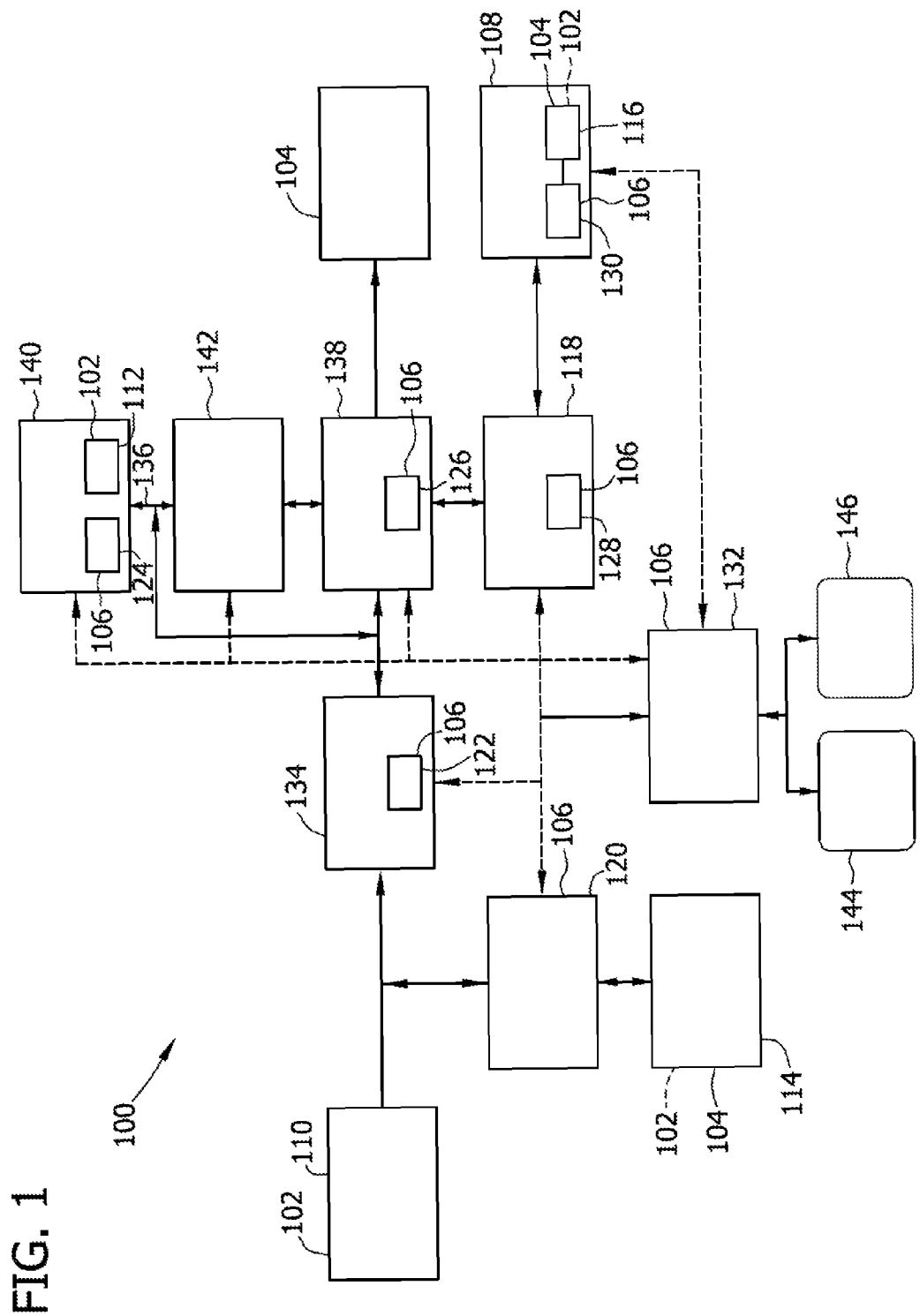
FIG. 1 is a block diagram of an exemplary power system.

FIG. 1 illustrates an exemplary power system 100 that includes a plurality of electrical power sources 102, a plurality of electrical loads 104, and a plurality of controllers 106. At least some power sources 102 may also operate as loads 104, and at least some loads 104 may operate as power sources 102 when controlled by one or more controllers 106. System 100 provides electricity to (also known as "charges") an electric vehicle 108 and/or one or more other loads 104.

As used herein, the terms "source" and "power source" refer to a device or system that generates and/or supplies electrical power to at least one other device or system, such as a load 104. As used herein, the term "load" refers to a device or system that consumes and/or stores electrical power received, for example, from a power source 102.

In an exemplary embodiment, power sources 102 include one or more renewable power sources 110 and/or one or more power sources 112 operated by a utility company (hereinafter referred to as "utility power sources 112"). In some embodiments, one or more power storage devices 114 of renewable power source (hereinafter referred to as "renewable power storage devices 114") and/or one or more power storage devices 116 of electric vehicle 108 (hereinafter referred to as "vehicle power storage device 116") may be configured to operate as a power source 102 to supply electrical power to one or more devices or components within system 100. As used herein, the terms "utility" and "utility company" refer to an entity or group of entities providing, maintaining, and/or operating an infrastructure and/or one or more sources used to supply energy or another resource to a plurality of customers or consumers. In an exemplary embodiment, the utility company is an electric utility company that provides, maintains, and/or operates an infrastructure (often referred to as an electrical grid) for supplying electrical power to a plurality of loads 104.

Loads 104 include one or more renewable power storage devices 114 and/or one or more vehicle power storage devices 116. In one embodiment, loads 104 also include one or more charging devices 118 for supplying power to one or more vehicle power storage devices 116. Renewable power storage devices 114 and/or vehicle power storage devices 116 include, without limitation, one or more batteries. Alternatively or additionally, loads 104 may include any other device within system 100 that consumes and/or stores electrical power within system 100. For example, loads 104 may include, without limitation, one or more motors, compressors, fans, lights, and/or computer systems (none shown).

In an exemplary embodiment, controllers 106 include a renewable storage charge controller 120, an inverter controller 122, a utility controller 124, a load center controller 126, a charging device controller 128, a vehicle controller 130, and/or a central charge controller 132. In an exemplary embodiment, each controller 106 within system 100 includes at least one processor and at least one memory (neither shown). The processor includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory includes a computer-readable storage medium, such as, without limitation, random access memory (RAM), flash memory, a hard disk drive, a solid state drive, a diskette, a flash drive, a compact disc, a digital video disc, and/or any suitable memory that enables the processors to store, retrieve, and/or execute instructions and/or data.

In an exemplary embodiment, renewable power source 110 is coupled to renewable storage charge controller 120 and to an inverter 134. Renewable power source 110 includes, in an exemplary embodiment, at least one photovoltaic (PV) panel and/or array that generates electrical energy from solar energy. Alternatively or additionally, renewable power source 110 may include one or more wind turbine generators, hydroelectric generators, geothermal generators, fuel cells, and/or any other power source that generates electrical energy from one or more renewable resources. In an exemplary embodiment, renewable power source 110 generates direct current (DC) voltage and current, and supplies the DC voltage and current to renewable power storage device 114 and/or to other loads 104 through inverter 134.

Renewable storage charge controller 120 is coupled to renewable power source 110 and to renewable power storage device 114. In an exemplary embodiment, renewable storage charge controller 120 monitors a charge state (also known as a "state-of-charge") of renewable power storage device 114. As used herein, the term "charge state" and "state-of-charge" refer to an amount or level of energy (also referred to as a "charge level") stored within a power storage device such as renewable power storage device 114 and/or vehicle power storage device 116. In an exemplary embodiment, the charge state also includes a representation of a relationship between the charge level within the power storage device and a maximum amount of charge that the power device is capable or configured to store.

In addition, renewable storage charge controller 120 controls a charging operation of renewable power storage device 114. More specifically, renewable storage charge controller 120 connects renewable power storage device 114 to renewable power source 110 if device 114 is able to be charged (e.g., if controller 120 determines that a charge level of device 114 is below a predefined charging threshold). If renewable power storage device 114 is unable to be charged (e.g., if controller 120 determines that the charge level of device 114 is equal to or exceeds the predefined charging threshold), controller 120 disconnects renewable power storage device 114 from renewable power source 110. In addition, renewable storage charge controller 120 switches renewable power storage device 114 from operating in a power storage mode to operating in a power supply mode in response to an input received from, for example, central charge controller 132.

As used herein, the term "power storage mode" refers to a mode or state of operation in which a device stores power received from a power source. As used herein, the term "power supply mode" refers to a mode or state of operation in which the device supplies power, for example, using power stored in the device.

In an exemplary embodiment, inverter 134 converts the DC voltage and current received from renewable power source 110 to alternating current (AC) voltage and current. Inverter controller 122 is included within inverter 134 and controls an operation of inverter 134, including the DC to AC conversion. In an exemplary embodiment, inverter controller 122 synchronizes the converted AC current and voltage with a voltage and/or a current of an electrical distribution network 136 (also known as an "electrical grid"). In addition, inverter controller 122 controls the operation of inverter 134 to couple renewable power source 110 to electrical distribution network 136 and/or to one or more loads 104 for supplying power to network 136 and/or loads 104. Inverter controller 122 also controls inverter 134 to disconnect renewable power source 110 from electrical distribution network 136 and/or from one or more loads 104 such that substantially no power is supplied from renewable power source 110 to network 136 and/or to loads 104. Inverter 134 transmits the converted AC power directly to electrical distribution network 136 and/or to one or more loads 104, or to another device, such as a load center 138, for delivering the AC power to network 136 and/or to loads 104.

A utility company 140 controls one or more utility power sources 112 using one or more utility controllers 124. Utility power sources 112 include one or more steam turbine generators, gas turbine generators, and/or any other generator that supplies electrical power to system 100 and/or to one or more loads 104 through electrical distribution network 136.

In an exemplary embodiment, one or more electricity meters 142 are coupled to utility power source 112 through electrical distribution network 136. Each meter 142 measures and/or calculates an amount of power supplied by utility power source 112 to one or more loads 104 coupled to meter 142. In addition, meter 142 may be coupled to utility controller 124 through an advanced metering infrastructure (AMI) network (not shown), and may transmit data representative of the measured power to utility controller 124 through the AMI network.

Load center 138 is coupled to meter 142, to inverter 134, and to loads 104 including charging device 118. Load center 138 includes a plurality of circuit breakers, fuses, electronic trip units, and/or any other device (not shown) that enables power to be configurably distributed or withheld from one or more loads 104 coupled to load center 138. In an exemplary embodiment, load center 138 receives power from power sources 102, such as utility power source 112 and/or renewable power source 110, and distributes the power to one or more loads 104 coupled to load center 138. In addition, load center 138 may receive a signal and/or a message from another controller 106, such as central charge controller 132, to electrically decouple one or more loads 104 from one or more power sources 102 such that load 104 receives substantially no power from power source 102 (i.e., load center 138 removes power from load 104).

In an exemplary embodiment, load center 138 includes load center controller 126 that communicates with other controllers 106, such as central charge controller 132, to control the operation of load center 138 and/or to receive and implement commands to electrically decouple loads 104 from power sources 102 and to electrically couple loads 104 to sources 102. In addition, load center controller 126 measures and/or receives measurements of an amount, frequency, phase, and/or rate of current, voltage, and/or power supplied to loads 104 coupled to load center 138. Load center controller 126 transmits data representative of the current, voltage, and/or power measurements to central charge controller 132.

Charging device 118, in an exemplary embodiment, is coupled to load center 138 and to electric vehicle 108. Charging device 118 receives power from one or more power sources 102 through load center 138, and performs a charging operation to supply power to electric vehicle 108. Charging device 118 includes charging device controller 128 that controls an operation, such as the charging operation, of charging device 118. More specifically, charging device controller 128 determines an amount, frequency, phase, and/or rate of current, voltage, and/or power to supply to vehicle power storage device 116. In addition, charging device controller 128 measures and/or receives measurements of the amount, frequency, phase, and/or rate of current, voltage, and/or power supplied to vehicle power storage device 116. In one embodiment, charging device controller 128 also controls a direction of current flow with respect to vehicle power storage device 116. More specifically, charging device controller 128 determines whether vehicle power storage device 116 is operated in the power storage mode or in the power supply mode. Accordingly, charging device controller 128 controls whether power is supplied to vehicle power storage device 116 (e.g., from a power source 102), or whether power stored in vehicle power storage device 116 is supplied from device 116 to one or more loads 104 within system 100.

In an exemplary embodiment, a user may enter a desired or requested completion time for the charging operation of charging device 118 with respect to vehicle power storage device 116 coupled to charging device 118. In other words, a user may enter a time at which the user desires the charging operation of vehicle power storage device 116 to be completed. Charging device controller 128 controls the charging operation to complete at, or before, the desired or requested completion time occurs. In an exemplary embodiment, charging device controller 128 and/or central charge controller 132 determine whether sufficient time exists to complete the charging operation within the requested completion time if the power storage device is switched to the power supply mode of operation. If insufficient time exists, charging device controller 128 and/or central charge controller 132 prevent vehicle power storage device 116 from switching to the power supply mode.

Electric vehicle 108 includes vehicle power storage device 116 and vehicle controller 130. Vehicle controller 130 monitors and/or determines a charge state (or state-of-charge) of vehicle power storage device 116. In one embodiment, based on the charge state of vehicle power storage device 116, vehicle controller 130 determines an amount, frequency, phase, and/or a rate of power and/or current to request from charging device 118. Vehicle controller 130 transmits a request for the determined amount, frequency, phase, and/or rate of power and/or current to charging device 118. Alternatively, vehicle controller 130 transmits a request for a maximum amount and/or rate of power and/or current that vehicle power storage device 116 can receive, or any other amount, frequency, phase, and/or rate of power and/or current.

In an exemplary embodiment, central charge controller 132 is coupled to each controller 106 within system 100. In one embodiment, central charge controller 132 is coupled to one or more controllers 106 through a wired connection, such as a wired Ethernet connection, a Recommended Standard (RS) 485 compliant connection, a powerline communication (PLC) connection, and/or any other wired connection. Additionally or alternatively, central charge controller is coupled to one or more controllers 106 through a wireless connection, such as a wireless Ethernet connection, a Zigbee connection, a Bluetooth connection, a cellular connection, and/or any other wireless connection.

Central charge controller 132 controls the charging operation of at least one other controller 106, such as renewable storage charge controller 120, inverter controller 122, load center controller 126, charging device controller 128, and/or vehicle controller 130. As described more fully herein, central charge controller 132 determines an operating condition of system 100 and/or of one or more power system components, such as power sources 102 and/or loads 104 within system 100. In an exemplary embodiment, central charge controller 132 receives data from controllers 106 and/or other components of system 100 to determine the operating condition. Central charge controller 132 communicates with one or more controllers 106 within system 100 to control the charging of, or delivery of power to, loads 104 based on the determined operating condition.

In an exemplary embodiment, one or more mobile devices 144 and/or one or more computers 146 may be coupled to central charge controller 132 for configuring and/or controlling central charge controller 132. Mobile devices 144 may include, without limitation, a cellular phone, a smart phone, a laptop computer, a tablet computing device, a personal data assistant (PDA), and/or any other device that enables data and/or commands to be transmitted to central charge controller 132. Computers 146 may include, without limitation, a server computer, a distributed array of computing devices, a desktop computer, and/or any other computing device that enables data and/or commands to be transmitted to central charge controller 132. Mobile devices 144 and/or computers 146 communicate with central charge controller 132 through a local area network (LAN), a wide area network (WAN), and/or any other network or connection.

A user may input commands and/or data, such as configuration data, into central charge controller 132 using mobile device 144 and/or computer 146. For example, central charge controller 132 may be at least partially implemented in a datacenter or in a cloud computing environment. In such an embodiment, a user interface (not shown in FIG. 1) may be implemented and/or accessed by mobile device 144 and/or computer 146 such that the user inputs data and/or commands through the user interface, and the data and/or commands are transmitted to central charge controller 132.

During operation, in an exemplary embodiment, renewable power source 110 generates power from renewable resources. Renewable storage charge controller 120 determines the charge state of renewable power storage device 114 and channels (i.e., transmits) the power generated by renewable power source 110 to device 114 if the charge state is below a charging threshold. Renewable power storage device 114 stores the power received from renewable power source 110. If only a portion of the power generated by renewable power source 110 is stored in renewable power storage device 114, or if no power generated by renewable power source 110 is stored in renewable power storage device 114, the remaining power from renewable power source 110 is channeled (i.e., transmitted) to inverter 134 for conversion from DC power to AC power. In some embodiments, at least a portion of the stored power within renewable power storage device 114 is supplied to inverter 134 for conversion into AC power. The converted AC power is channeled to load center 138 for distribution to loads 104.

At least one utility power source 112 generates and/or supplies AC power to system 100. The power supplied by utility power source 112 is measured by meter 142 and is channeled to load center 138. Load center 138 distributes the power received (e.g., from renewable power source 110 and/or utility power source 112) to loads 104. In addition, load center 138 may electrically decouple loads 104 from renewable power source 110, utility power source 112, and/or any other component of system 100 based on signals received from load center controller 126 and/or from any other controller 106 within system 100. For example, if utility controller 124 and/or central charge controller 132 implements a load shedding policy to reduce power consumption within system 100, load center controller 126 "sheds" one or more loads 104 by opening a contactor or another circuit protection device (not shown) to electrically decouple loads 104 from renewable power source 110, utility power source 112, and/or any other component of system 100.

If an electric vehicle 108 is coupled to charging device 118 and requests power to be supplied, charging device 118 receives power from one or more power sources 102 and supplies power to vehicle 108. If electric vehicle 108 no longer requests power (e.g., if vehicle power storage device 116 reaches a predetermined charge threshold), charging device 118 stops supplying power to vehicle 108.

Central charge controller 132 receives data from other controllers 106 and determines a charging status of system 100. The charging status may include, without limitation, a determination of an amount of current, voltage, and/or power supplied and/or forecasted to be supplied by power sources 102, an amount of current, voltage, and/or power requested and/or forecasted to be requested and/or received by loads 104, a determination that a peak demand event is occurring or is forecasted to occur, and/or any other determination that enables system 100 to function as described herein.

Central charge controller 132 controls the delivery of power to loads 104 based on the charging status of system 100. For example, central charge controller 132 transmits one or more signals to renewable storage charge controller 120 to control the charging operation of renewable power storage device 114, to control the switching of renewable power storage device 114 between the power storage mode and the power supply mode, and/or to control the supply of power from renewable power storage device 114.

In addition, central charge controller 132 transmits one or more signals to inverter 134 to control the conversion of DC power received from renewable power source 110 and/or renewable power storage device 114 to AC power. In one embodiment, central charge controller 132 also notifies and/or commands inverter 134 to channel AC power to electrical distribution network 136 and/or to loads 104, or to electrically decouple renewable power source 110 and/or renewable power storage device 114 from network 136 and/or loads 104.

Central charge controller 132 transmits one or more signals to load center controller 126 to electrically couple or decouple one or more loads 104 to or from one or more power sources 102. For example, if an amount of power supplied, or forecasted to be supplied, by power sources 102 is insufficient to provide a requested amount of power to loads 104, central charge controller 132 may transmit one or more signals to load center controller 126 to remove power from (i.e., electrically decouple) one or more loads 104 identified by central charge controller 132 and/or load center controller 126. In addition, load center controller 126 decoupled one or more utility power sources 112 from loads 104 in response to a command or other signal received, for example, from central charge controller 132, such that loads 104 only receive power from renewable power sources 110, renewable power storage devices 114, and/or vehicle power storage devices 116. For example, central charge controller 132 may command load center controller 126 to electrically decouple one or more utility sources 112 if utility sources 112 are not needed to satisfy the power requested or demanded from loads 104, if a peak demand notification or event is received, if a cost of power supplied by utility sources 112 exceeds a threshold, and/or if any other suitable condition is satisfied or met.

In addition, central charge controller 132 controls the operation of charging device 118 by transmitting one or more signals to charging device controller 128. For example, central charge controller 132 may receive data from charging device controller 128 indicative of a first amount, frequency, phase, and/or rate of current that electric vehicle 108 is requesting, and may transmit data to charging device controller 128 indicative of a second amount, frequency, phase, and/or rate of current for charging device 118 to supply to electric vehicle 108. In addition, central charge controller 132 may command central charge controller 132 to receive current from electric vehicle 108 such that vehicle 108 operates in the power supply mode, rather than the power storage mode. Alternatively or additionally, central charge controller 132 may transmit signals to vehicle controller 130 to command electric vehicle 108 to request a specific amount, frequency, phase, and/or rate of current to be supplied from charging device 118. Central charge controller 132 may also transmit signals to vehicle controller 130 to switch electric vehicle 108 between the power storage mode and the power supply mode such that electric vehicle 108 receives current from charging device 118 or supplies current to charging device 118 as commanded by central charge controller 132.

Figure 2:
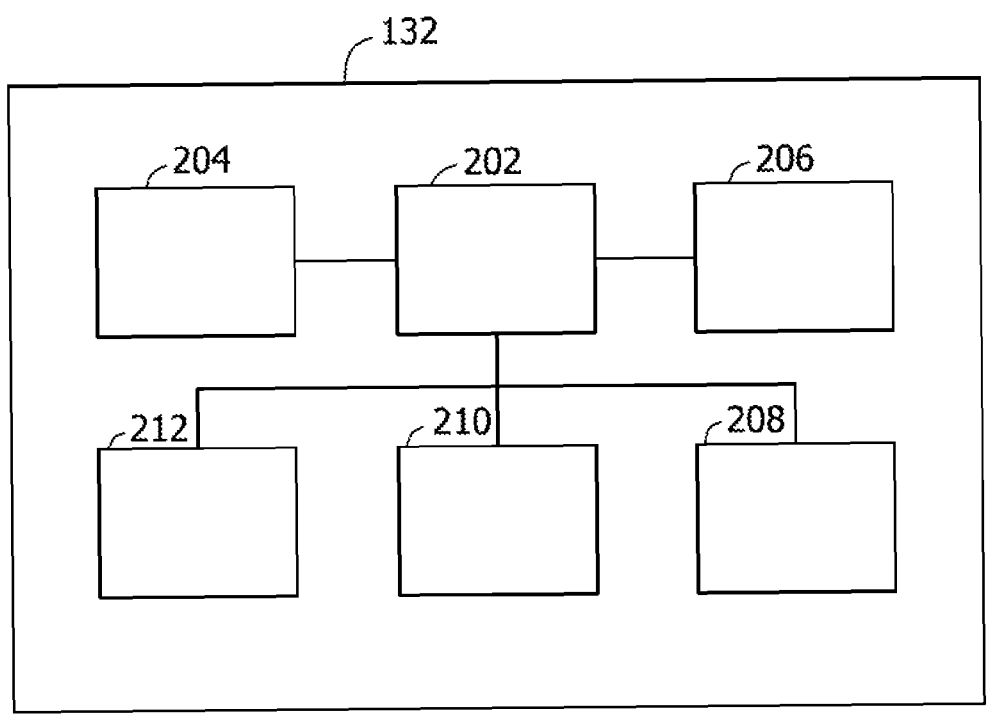
FIG. 2 is a block diagram of an exemplary central charge controller that may be used with the power system shown in FIG. 1.

FIG. 2 is a block diagram of exemplary central charge controller 132 that may be used with power system 100 (shown in FIG. 1). In an exemplary embodiment, central charge controller 132 includes a processor 202, a memory 204, a display 206, a user interface 208, a network interface 210, and/or an input/output (I/O) interface 212. In an exemplary embodiment, each component of central charge controller 132 is communicatively coupled to processor 202. In addition, power sources 102, loads 104, and/or controllers 106 (shown in FIG. 1) are communicatively coupled to processor 202. Alternatively, one or more components of central charge controller 132 may be implemented by, and/or included within, another device communicatively coupled to central charge controller 132, such as mobile device 144 and/or computer 146 (shown in FIG. 1).

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Processor 202 controls the operation of central charge controller 132.

Memory 204 includes a computer-readable storage medium, such as, without limitation, random access memory (RAM), flash memory, a hard disk drive, a solid state drive, a diskette, a flash drive, a compact disc, a digital video disc, and/or any suitable memory that enables the processors to store, retrieve, and/or execute instructions and/or data. Memory 204 includes a plurality of computer-executable instructions that, when executed by processor 202, cause processor 202 to perform the functions described herein.

In an exemplary embodiment, display 206 includes a liquid crystal display (LCD), a cathode ray tube (CRT), a plasma display, a vacuum fluorescent display (VFD), one or more light-emitting diodes (LED), and/or any other suitable visual output device capable of displaying graphical data and/or text to a user. In an exemplary embodiment, aspects of user interface 208 are displayed to the user by display 206.

User interface 208 includes, without limitation, a keyboard, a keypad, a touch-sensitive screen, a scroll wheel, a pointing device, an audio input device employing speech-recognition software, and/or any suitable device that enables a user to input data into central charge controller 132 and/or to retrieve data from central charge controller 132. Through user interface 208, a user may input data and/or commands to central charge controller 132 for controlling and/or configuring central charge controller 132. In one embodiment, display 206 and/or user interface 208 are implemented and/or included within a device remote from central charge controller 132, such as mobile device 144 and/or computer 146. In such an embodiment, data is transmitted between the remote device (e.g., display 206 and/or user interface 208) and central charge controller 132.

Network interface 210 transmits and receives data between central charge controller 132 and a remote device or system. In an exemplary embodiment, network interface 210 is communicatively coupled to at least one other controller 106 (shown in FIG. 1) such that each controller 106 transmits data to, and receives data from, central charge controller 132. In an exemplary embodiment, network interface 210 is coupled to at least one other controller 106 using any suitable wired data conduit, such as an Ethernet cable, a Recommended Standard (RS) 485 compliant cable, and/or any other data conduit that enables central charge controller 132 to function as described herein. Additionally or alternatively, network interface 210 communicates wirelessly with at least one other controller 106 using any suitable wireless connection and/or protocol.

I/O interface 212 transmits and receives data between central charge controller 132 and a remote device or system. In an exemplary embodiment, I/O interface 212 is communicatively coupled to at least one other power source 102 and/or load 104 (shown in FIG. 1) such that one or more power sources 102 and/or loads 104 transmit data to central charge controller 132. More specifically, each power source 102 and/or load 104 coupled to I/O interface 212 transmits operating condition data to central charge controller 132 for use in determining the charging status of system 100. In an exemplary embodiment, I/O interface 212 is coupled to power sources 102 and/or loads 104 using any suitable data conduit, such as a universal serial bus (USB) cable, an RS-232 cable, a peripheral component interconnect express (PCI Express) cable, and/or any other data conduit that enables central charge controller 132 to function as described herein. In an alternative embodiment, central charge controller 132 does not include I/O interface 212, and the functionality of I/O interface 212 is included within network interface 210.

Figure 3:
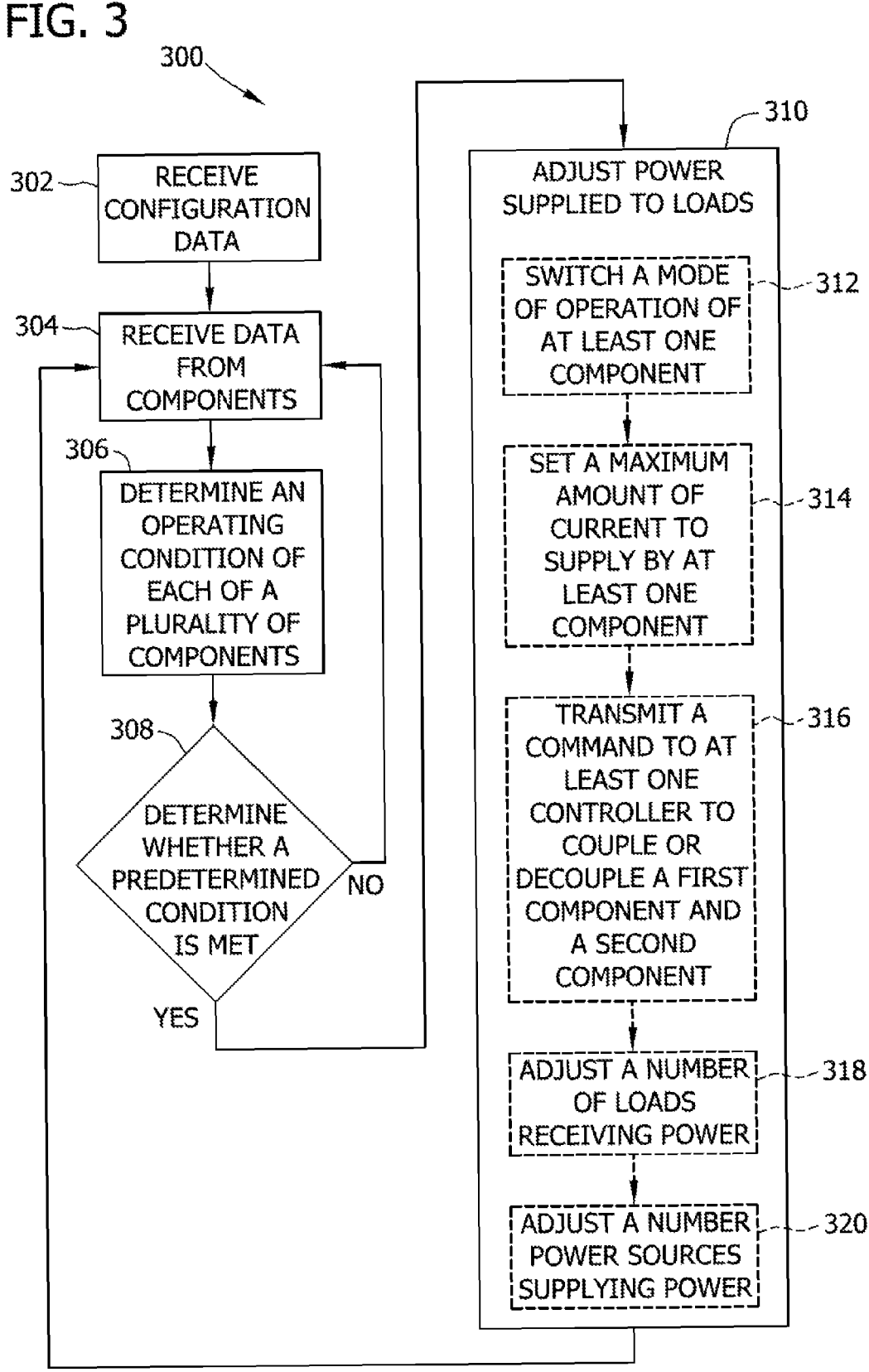
FIG. 3 is a flow diagram of an exemplary method of controlling a power system that may be executed by the central charge controller shown in FIG. 2.

FIG. 3 is a flow diagram of an exemplary method 300 for controlling a power system, such as power system 100 (shown in FIG. 1). In an exemplary embodiment, method 300 is implemented by central charge controller 132 (shown in FIG. 1). Accordingly, method 300 is embodied within a plurality of instructions stored within memory 204, and is executed by processor 202 (both shown in FIG. 2).

In an exemplary embodiment, central charge controller 132 receives 302 configuration data to configure the operation of controller 132 and/or method 300. In an embodiment, a user or another computer or device transmits and/or inputs the configuration data to central charge controller 132 through user interface 208 and/or through network interface 210 (both shown in FIG. 2). The configuration data may include identifying loads 104, power sources 102, and/or controllers 106 within system 100 and/or information related to establishing data connections with loads 104, power sources 102, and/or controllers 106. The configuration data may also include a priority determination or categorization for each load 104, and may include identifying or categorizing loads 104 that are a high priority for delivering power thereto, and loads 104 that are a low priority for delivering power thereto. Alternatively or additionally, the configuration data may include one or more predetermined conditions to be satisfied or met, and/or any other data that enables method 300 to function as described herein.

Central charge controller 132 receives 304 data from components of system 100 (also referred to as "power system components"), such as loads 104, power sources 102, and/or controllers 106. In an exemplary embodiment, the system components transmit the data to central charge controller 132 in response to a request for information transmitted by controller 132, and/or the components "self-report" by transmitting the data to central charge controller 132 based on predetermined criteria. The data received 304 includes, without limitation, data relating to operation of the system components.

For example, central charge controller 132 receives from each renewable power source 110 data representative of a current and/or a voltage generated by source 110. Renewable storage charge controller 120 transmits data representative of the charge state of renewable power storage device 114 and an amount and/or rate of charging current and/or power being supplied to, or from, renewable power storage device 114. Inverter controller 122 transmits data representative of a current and/or voltage received from renewable power source 110 and/or an amount of current and/or voltage being supplied to electrical distribution network 136 and/or to one or more loads 104.

Utility controller 124, in an exemplary embodiment, transmits data representative of a peak demand notification or event, one or more rates for power supplied by utility power source 112, a power outage notification or event, a reduction or increase in power output from utility power source 112, a forecasted condition or data relating to one of the aforementioned types of data, and/or any other data that enables method 300 to function as described herein. Meter 142 transmits data representative of a power consumption of loads 104 and/or a current and/or a voltage supplied to loads 104 by utility power source 112.

Load center controller 126 transmits data representative of a power consumption of one or more loads 104, a voltage and/or a current supplied to one or more loads 104, and/or a number or identification of loads 104 that are electrically coupled to load center 138 and/or receiving power from one or more power sources 102. Charging device controller 128 and/or vehicle controller 130 transmits data representative of an amount, frequency, phase, and/or a rate of current, voltage, and/or power supplied to, or from, vehicle power storage device 116, a time that a user requests charging device 118 to complete a charging operation for vehicle power storage device 116, and/or a state-of-charge of vehicle power storage device 116.

Additionally or alternatively, the system components may transmit any suitable data to central charge controller 132 to enable method 300 to function as described herein, and central charge controller 132 receives 304 the data transmitted by the system components. In one embodiment, a plurality of central charge controllers 132 are included within system 100. In such an embodiment, each central charge controller 132 receives data from at least one other central charge controller 132.

In an exemplary embodiment, central charge controller 132 determines 306 an operating condition of each of a plurality of components within system 100, such as an operating condition of each load 104 and/or each power source 102 within system 100. The operating condition includes, for example: a determination of the amount, frequency, phase, and/or rate of current, voltage, and/or power requested by, or supplied to, loads 104; an amount, frequency, phase, and/or rate of current, voltage, and/or power forecasted to be requested by, or supplied to, loads 104; an amount, frequency, phase, and/or rate of current, voltage, and/or power available to be supplied by power sources 102; a forecasted amount, frequency, phase, and/or rate of current, voltage, and/or power available to be supplied by power sources 102; a difference between the amount, frequency, phase, and/or rate of current, voltage and/or power requested and the amount, frequency, phase, and/or rate of current, voltage, and/or power available; and/or a difference between the amount, frequency, phase, and/or rate of current, voltage and/or power forecasted to be requested and the amount, frequency, phase, and/or rate of current, voltage, and/or power forecasted to be available. In an exemplary embodiment, the operating condition additionally or alternatively includes a determination of a cost of power available to be supplied, a cost of power supplied, a forecasted cost of power available to be supplied, and/or a forecasted cost of power to be supplied in the future. In an exemplary embodiment, the operating condition is determined by receiving and analyzing signals and/or data from power sources 102, loads 104, and/or controllers 106.

Central charge controller 132 determines 308 whether a predetermined condition is satisfied or met based on at least one determined operating condition of at least one component of power system 100. In an exemplary embodiment, central charge controller 132 determines 308 that the predetermined condition is satisfied or met if loads 104 are requesting or are forecasted to request more or less power than is available or is forecasted to be available from power sources 102. Additionally or alternatively, central charge controller 132 may determine 308 that the predetermined condition is satisfied or met if a peak demand event is occurring or is forecasted to occur, if a condition, such as a weather condition (e.g., sunny weather or cloudy weather) is forecasted to occur, if a cost of power supplied or forecasted to be supplied by utility power source 112 changes and/or increases above or decreases below a predetermined threshold, if a user identified condition occurs, and/or if any other condition is satisfied or met.

If central charge controller 132 determines 308 that the predetermined condition is not satisfied or met, central charge controller 132 returns to receiving 304 data from the components of system 100. However, if central charge controller 132 determines 308 that the predetermined condition is satisfied or met, central charge controller 132 implements at least one action to adjust 310 the power supplied to loads 104.

In one embodiment, central charge controller 132 adjusts 310 the power supplied to loads 104 by switching 312 a mode of operation of at least one component, such as renewable power storage device 114 and/or vehicle power storage device 116. More specifically, central charge controller 132 transmits a command to renewable storage charge controller 120 to switch renewable power storage device 114 from the power storage mode to the power supply mode or from the power supply mode to the power storage mode. Central charge controller 132 transmits a command to charging device controller 128 and/or to vehicle controller 130 to switch vehicle power storage device 116 from the power storage mode to the power supply mode or from the power supply mode to the power storage mode. While in the power supply mode, renewable power storage device 114 and/or vehicle power storage device 116 supply power to at least one load 104 within system 100, for example, through load center 138.

In another embodiment, central charge controller 132 adjusts 310 the power supplied to loads 104 by setting 314 a maximum amount of current and/or power to supply by at least one system component. In one embodiment, central charge controller 132 transmits a command to charging device controller 128 to set 314 a maximum amount of current to supply to vehicle power storage device 116. Central charge controller 132 may also transmit a command to charging device controller 128 and/or to vehicle controller 130 to set 314 a maximum amount of current to supply from vehicle power storage device 116.

In an exemplary embodiment, central charge controller 132 adjusts 310 the power supplied to loads 104 by transmitting 316 a command to at least one other controller 106 to electrically couple a first power system component to a second power system component, or to electrically decouple the first power system component from the second power system component. For example, if the predetermined condition is met (e.g., if power sources 102 are supplying or are available to supply more power than is needed by loads 104), central charge controller 132 transmits 316 a command to load center controller 126 to electrically decouple one or more utility power sources 112 from one or more loads 104. Accordingly, loads 104 may receive power only from renewable power sources 102 and/or power storage devices 114 and/or 116. Additionally or alternatively, if the predetermined condition is met, central charge controller 132 may transmit 316 a command to load center controller 126 to electrically couple vehicle power storage device 116 to one or more loads 104 after vehicle power storage device 116 has been switched from the power storage mode to the power supply mode.

In one embodiment, central charge controller 132 may categorize or prioritize loads 104 such that at least one load 104 is categorized as a high priority load 104 and at least one load 104 is categorized as a low priority load 104. In such an embodiment, central charge controller 132 may electrically decouple one or more power sources 102 from low priority load 104 while maintaining a supply of power to high priority load 104 from power source 102. The categorization or prioritization may be based on any suitable criteria, such as based on a user identified priority list, a cost of power consumed by load 104, a financial benefit of load 104, an amount of power consumed by load 104, a location of load 104, information regarding the ownership of load 104 and/or the identity of the operator of load 104, an amount of charge needed to complete a charging operation of load 104 (e.g., of renewable power storage device 114 and/or vehicle power storage device 116), and/or any other criteria.

In addition, one or more power sources 102 may be prioritized and/or categorized in a similar manner using the same or different criteria such that central charge controller 132 may prioritize which power sources 102 supply power to loads 104, for example, in an event that not all power sources 102 are needed to satisfy the power demands of loads 104. In such an embodiment, central charge controller 132 may electrically decouple low priority power sources 102 from loads 104 if the power supplied by each low priority power source 102 is not needed. In a similar manner, power sources 102 may be coupled to loads 104 in a prioritized manner if additional power is needed.

In one embodiment, central charge controller 132 transmits 316 a command to at least one other controller 106 to adjust 318 a number of loads 104 that are receiving power within system 100. For example, central charge controller 132 may transmit a command to load center controller 126 to electrically decouple, or remove power from, one or more loads 104 such that loads 104 do not receive power from power sources 102. In one embodiment, central charge controller 132 maintains the supply of power to high priority loads 104 and only removes power from one or more low priority loads 104. Additionally or alternatively, central charge controller 132 may adjust 318 the number of loads 104 receiving power by switching a load 104 from a power storage mode of operation to a power supply mode of operation such that load 104 operates as a power source 102 to supply power, rather than receiving power.

In another embodiment, central charge controller 132 transmits 316 a command to at least one other controller 106 to adjust 320 a number of power sources 102 that are supplying power within system 100. For example, if central charge controller 132 determines that the amount of power available to be supplied or that is forecasted to be supplied exceeds the amount of power requested by loads 104 or forecasted to be requested by loads 104, central charge controller 132 may transmit a command to inverter controller 122 to electrically decouple one or more renewable power sources 110 from system 100 such that renewable power sources 110 do not supply power to one or more loads 104 within system 100. Additionally or alternatively, central charge controller 132 transmits a command to load center controller 126 to electrically decouple one or more utility power sources 112 from one or more loads 104 and/or load center 138 such that utility power sources 112 do not supply power to one or more loads 104 within system 100. Additionally or alternatively, central charge controller 132 may adjust 320 the number of power sources 102 that are supplying power to loads 104 by switching a load 104 from a power storage mode of operation to a power supply mode of operation such that load 104 operates as a power source 102.

After central charge controller 132 has adjusted 310 the power supplied to loads 104, central charge controller 132 returns to receiving 304 data from the system components as described above. While one or more of the foregoing embodiments may have been described separately, it should be recognized that any of the foregoing embodiments, or portions thereof, may be used in place of, or in conjunction with, any other embodiment described herein.

As described herein, a robust central charge controller controls the operation of a power system. The charge controller receives data from a plurality of power system components, such as one or more loads, power sources, and/or controllers. The central charge controller determines if the power supplied to one or more loads should be adjusted, and implements one or more actions to adjust the supplied power. The central charge controller may switch a component between a power storage mode and a power supply mode, set a maximum current to be supplied to a load, adjust a number of loads that receive power from the power sources, and/or adjust a number of power sources supplying power to the loads. The central charge controller may also adjust the power supplied to at least one load based on one or more forecasted conditions. Accordingly, if an electrical grid is unusable or unavailable, the power generated by the solar panel array may still be supplied to one or more loads. In addition, during times of high power demand, one or more components may be switched to a power supply mode to provide additional power, and/or one or more loads may be electrically decoupled to reduce an amount of power requested within the power system. As such, the central charge controller enables the amount of power requested to be maintained approximately equal to the amount of power supplied within the power system.

A technical effect of the systems, devices, and methods described herein includes at least one of (a) determining, by a first controller, an operating condition of at least one first power system component and at least one second power system component of a plurality of power system components within a power system; (b) determining, by a first controller, whether a predetermined condition is met based on at least one operating condition; and (c) transmitting, by a first controller, a command to at least one second controller to at least one of electrically couple at least one first power system component to at least one second power system component and electrically decouple the at least one first power system component from the at least one second power system component based on whether a predetermined condition is met.

Exemplary embodiments of a controller and a method of controlling a power system are described above in detail. The controller and method are not limited to the specific embodiments described herein, but rather, components of the controller and/or steps of the method may be utilized independently and separately from other components and/or steps described herein. For example, the controller may also be used in combination with other power systems and methods, and is not limited to practice with only the power system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for a power system including a plurality of power system components, said controller comprising:

a memory for storing computer-executable instructions; and a processor coupled to said memory and to the plurality of power system components, said processor configured to execute the computer-executable instructions, wherein the computer-executable instructions program said processor to:

determine an operating condition of at least one first power system component and at least one second power system component of the plurality of power system components, wherein the at least one second power system component includes a power storage device switchable between a power storage mode of operation and a power supply mode of operation;

identify a predetermined time for completing a charging operation of the power storage device;

determine whether a switching of the power storage device from the power storage mode of operation to the power supply mode of operation will prevent the charging operation from completing within the predetermined time;

determine whether a predetermined condition is met based on at least one operating condition; and transmit a command to at least one other controller to at least one of electrically couple the at least one first power system component to the at least one second power system component and electrically decouple the at least one first power system component from the at least one second power system component based on whether the predetermined condition is met.

2. The controller in accordance with claim 1, wherein said processor is further programmed to transmit a command to the at least one other controller to set a maximum amount of current to supply to the power storage device.

3. The controller in accordance with claim 1, wherein said processor is further programmed to transmit a command to the at least one other controller to switch the power storage device from the power storage mode of operation to the power supply mode of operation.

4. The controller in accordance with claim 3, wherein the power storage device is a power storage device of an electric vehicle, said processor is further programmed to:

identify the predetermined time for completing the charging operation of the power storage device by receiving a requested completion time for the charging operation.

5. The controller in accordance with claim 1, wherein the at least one first power system component includes a utility power source coupled to the at least one second power system component and configured to supply power to the at least one second power system component, said processor is further programmed to electrically decouple the utility power source from the at least one second power system component based on whether the predetermined condition is met.

6. The controller in accordance with claim 1, wherein the at least one second power system component includes a plurality of loads configured to receive power from the at least one first power system component, said processor is further programmed to categorize the plurality of loads into at least one high priority load and at least one low priority load.

7. The controller in accordance with claim 6, wherein said processor is further programmed to electrically decouple the at least one low priority load from the at least one first power system component while maintaining a supply of power to the at least one high priority load from the at least one first power system component.

8. The controller in accordance with claim 1, wherein said processor is further programmed to transmit a command to the at least one other controller to at least one of electrically couple the at least one first power system component to the at least one second power system component and electrically decouple the at least one first power system component from the at least one second power system component based on at least one forecasted condition of the power system.

9. At least one non-transitory computer-readable storage medium having computer-executable instructions embodied therein, wherein, when executed by a processor, the computer-executable instructions cause the processor to:

determine an operating condition of at least one first power system component and at least one second power system component of a plurality of power system components within a power system, wherein the at least one second power system component includes a power storage device switchable between a power storage mode of operation and a power supply mode of operation;

identify a predetermined time for completing a charging operation of the power storage device;

determine whether a switching of the power storage device from the power storage mode of operation to the power supply mode of operation will prevent the charging operation from completing within the predetermined time;

determine whether a predetermined condition is met based on at least one operating condition; and transmit a command to at least one controller to at least one of electrically couple the at least one first power system component to the at least one second power system component and electrically decouple the at least one first power system component from the at least one second power system component based on whether the predetermined condition is met.

10. At least one non-transitory computer-readable storage medium in accordance with claim 9, wherein the computer-executable instructions further cause the processor to transmit a command to the at least one controller to switch the power storage device from the power storage mode of operation to the power supply mode of operation.

11. At least one non-transitory computer-readable storage medium in accordance with claim 10, wherein the power storage device is a power storage device of an electric vehicle, and wherein the computer-executable instructions further cause the processor to:

identify the predetermined time for completing the charging operation of the power storage device by receiving a requested completion time for the charging operation.

12. At least one non-transitory computer-readable storage medium in accordance with claim 9, wherein the at least one first power system component includes a utility power source coupled to the at least one second power system component and configured to supply power to the at least one second power system component, the computer-executable instructions further cause the processor to electrically decouple the utility power source from the at least one second power system component based on whether the predetermined condition is met.

13. At least one non-transitory computer-readable storage medium in accordance with claim 9, wherein the at least one second power system component includes a plurality of loads configured to receive power from the at least one first power system component, the computer-executable instructions further cause the processor to categorize the plurality of loads into at least one high priority load and at least one low priority load.

14. At least one non-transitory computer-readable storage medium in accordance with claim 13, wherein the computer-executable instructions further cause the processor to electrically decouple the at least one low priority load from the at least one first power system component while maintaining a supply of power to the at least one high priority load from the at least one first power system component.

15. At least one non-transitory computer-readable storage medium in accordance with claim 9, wherein the computer-executable instructions further cause the processor to transmit a command to the at least one controller to at least one of electrically couple the at least one first power system component to the at least one second power system component and electrically decouple the at least one first power system component from the at least one second power system component based on at least one forecasted condition of the power system.

16. A method of controlling a power system, said method comprising:
   determining, by a first controller, an operating condition of at least one first power system component and at least one second power system component of a plurality of power system components within the power system, wherein the at least one second power system component includes a power storage device switchable between a power storage mode of operation and a power supply mode of operation;
   identifying a predetermined time for completing a charging operation of the power storage device;
   determining whether a switching of the power storage device from the power storage mode of operation to the power supply mode of operation will prevent the charging operation from completing within the predetermined time;
   determining, by the first controller, whether a predetermined condition is met based on at least one operating condition; and
   transmitting, by the first controller, a command to at least one second controller to at least one of electrically couple the at least one first power system component to the at least one second power system component and electrically decouple the at least one first power system component from the at least one second power system component based on whether the predetermined condition is met.

17. The method in accordance with claim 16, further comprising transmitting, by the first controller, a command to the at least one second controller to switch the power storage device from the power storage mode of operation to the power supply mode of operation.

18. The method in accordance with claim 16, wherein the at least one first power system component includes a utility power source coupled to the at least one second power system component and configured to supply power to the at least one second power system component, said method further comprising electrically decoupling the utility power source from the at least one second power system component based on whether the predetermined condition is met.

19. The method in accordance with claim 16, wherein the at least one second power system component includes a plurality of loads configured to receive power from the at least one first power system component, said method further comprising:
   categorizing the plurality of loads into at least one high priority load and at least one low priority load; and
   electrically decoupling the at least one low priority load from the at least one first power system component while maintaining a supply of power to the at least one high priority load from the at least one first power system component.

20. The method in accordance with claim 16, further comprising transmitting, by the first controller, a command to the at least one second controller to at least one of electrically couple the at least one first power system component to the at least one second power system component and electrically decouple the at least one first power system component from the at least one second power system component based on at least one forecasted condition of the power system.

* * * * *